No. 727,646. PATENTED MAY 12, 1903.
W. J. LEARY.
BRICK MOLDING MACHINE.
APPLICATION FILED FEB. 26, 1902.
NO MODEL. 2 SHEETS—SHEET 1.

Witnesses: W. J. Leary, Inventor.
By Wilhelm Bonner, Attorneys.

No. 727,646. PATENTED MAY 12, 1903.
W. J. LEARY.
BRICK MOLDING MACHINE.
APPLICATION FILED FEB. 26, 1902.
NO MODEL. 2 SHEETS—SHEET 2.
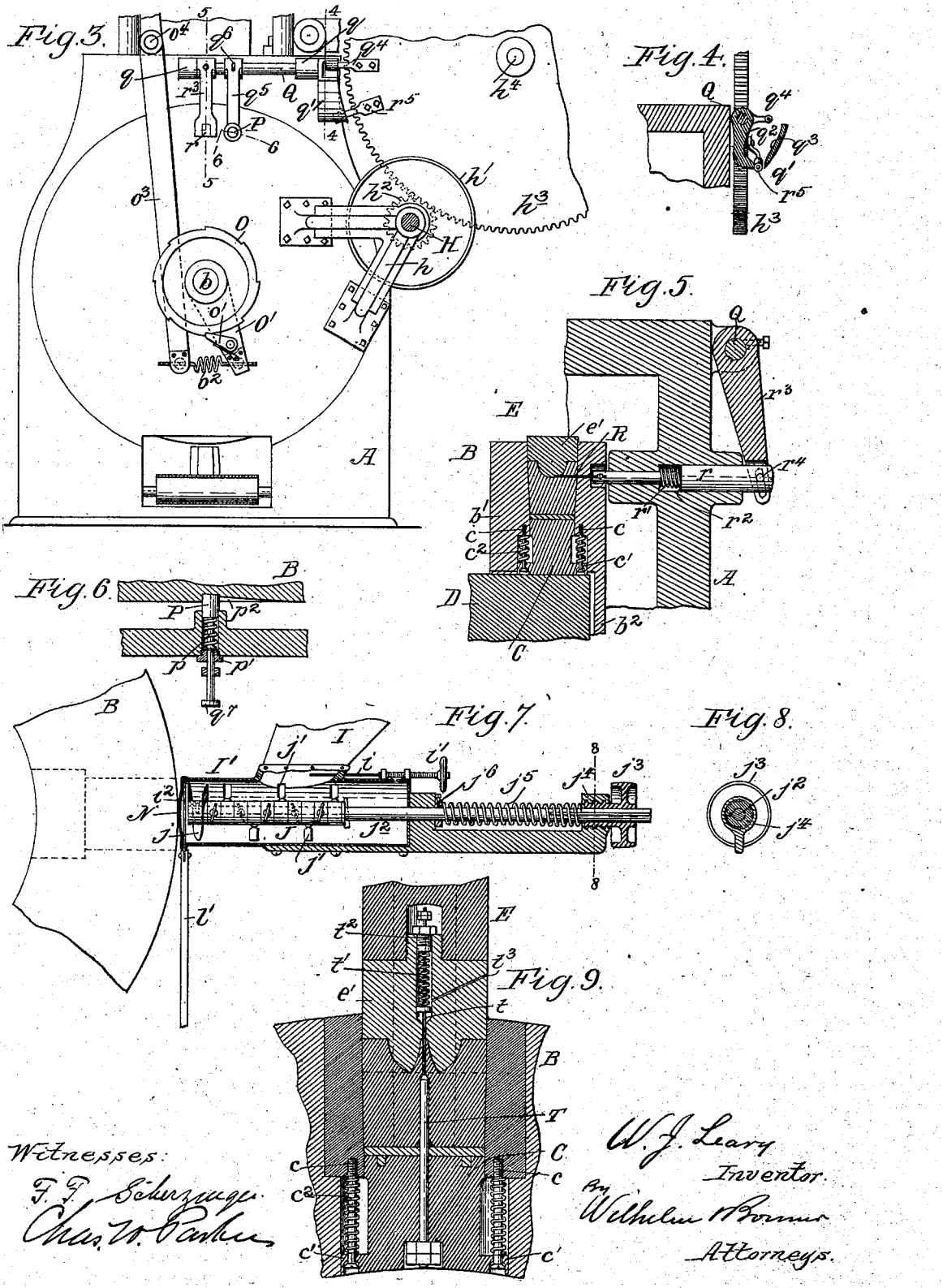
Witnesses:
W. J. Leary
Inventor.
Attorneys.

No. 727,646. Patented May 12, 1903.

UNITED STATES PATENT OFFICE.

WILLIAM J. LEARY, OF BUFFALO, NEW YORK.

BRICK-MOLDING MACHINE.

SPECIFICATION forming part of Letters Patent No. 727,646, dated May 12, 1903.

Application filed February 26, 1902. Serial No. 95,697. (No model.)

*To all whom it may concern:*

Be it known that I, WILLIAM J. LEARY, a citizen of the United States, residing at Buffalo, in the county of Erie and State of New York, have invented new and useful Improvements in Brick-Molding Machines, of which the following is a specification.

This invention relates to a brick-molding machine of that kind comprising an intermittently-rotated mold-wheel provided with peripheral molds, a feed mechanism for introducing the plastic material into the molds, a reciprocating plunger for pressing the material in the molds, and a discharge-plunger for ejecting the pressed bricks from the molds.

The main object of the invention is to produce a machine of simple construction which is durable, efficient, and has a large capacity.

A further object is to provide a simple feed mechanism for accurately measuring or gaging the quantity of material for each brick.

Figure 1:
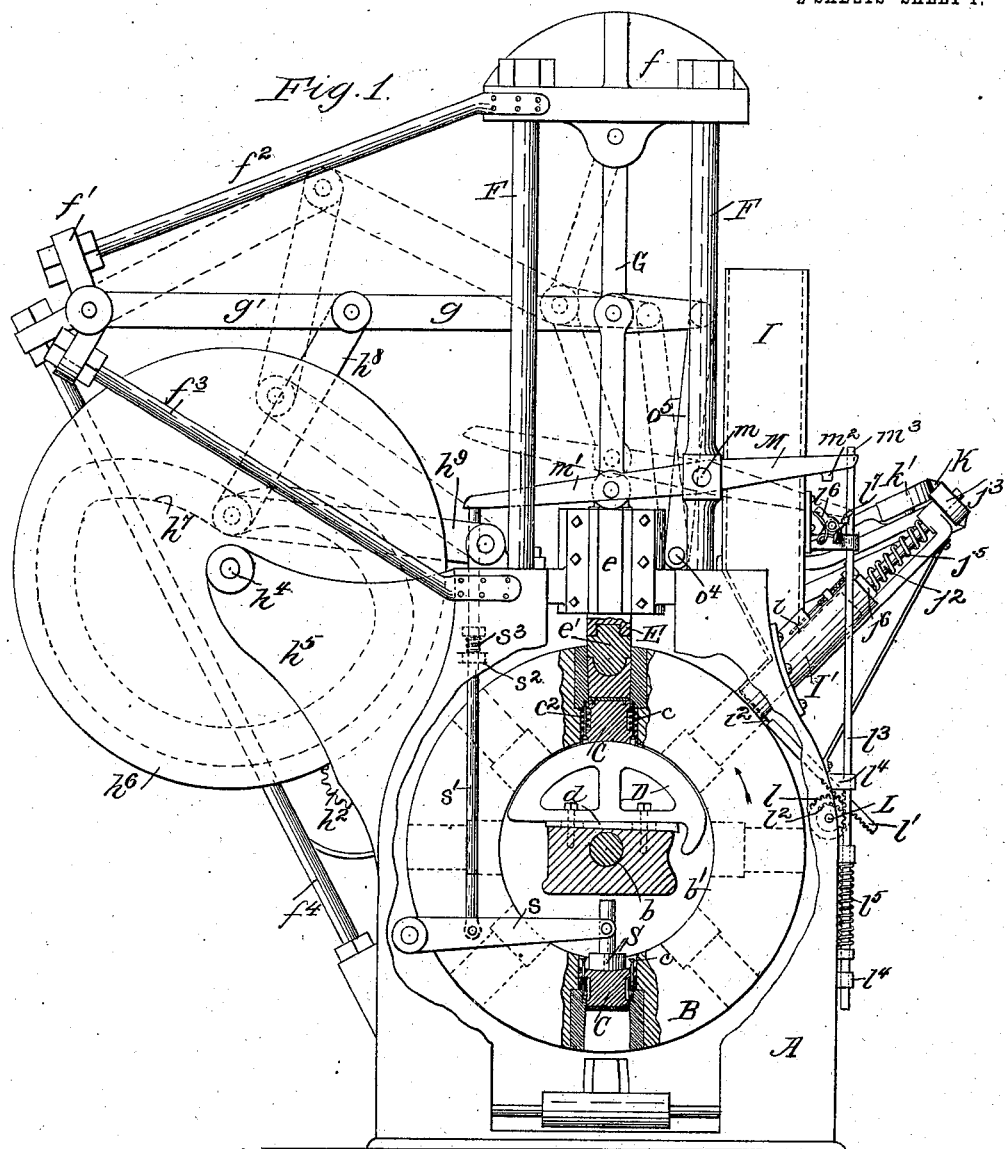
Figure 2:
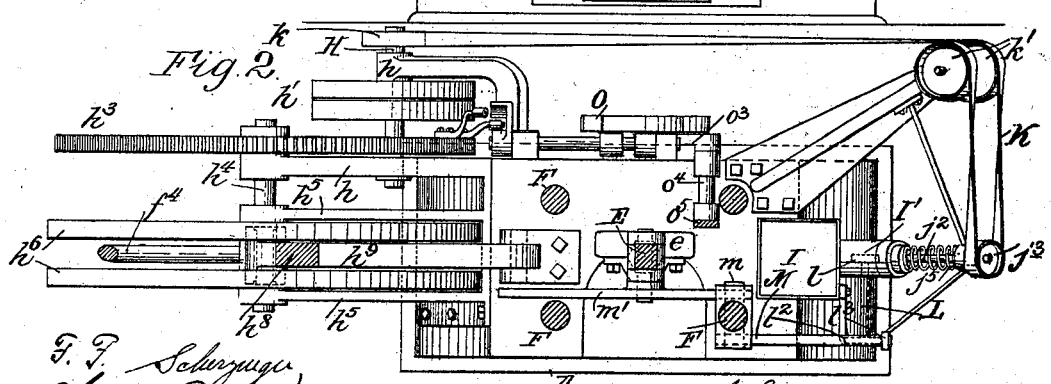

In the accompanying drawings, consisting of two sheets, Figure 1 is a front elevation, partly in section, of a brick-molding machine embodying my invention. Fig. 2 is a plan view thereof, parts of the operating mechanism for the press-plunger being broken away. Fig. 3 is a fragmentary rear elevation of the machine. Fig. 4 is a section on line 4 4, Fig. 3, showing the mechanism for operating the perforating-pin and the holding-latch for the mold-wheel. Fig. 5 is a section, on an enlarged scale, on the line 5 5, Fig. 3, showing the perforating-pin and operating parts. Fig. 6 is a section on line 6 6, Fig. 3, on an enlarged scale, showing the holding-latch for the mold-wheel. Fig. 7 is a longitudinal section, on an enlarged scale, through the feed mechanism. Fig. 8 is a section on line 8 8, Fig. 7. Fig. 9 is a section through a mold and the end of the press-plunger, showing a perforating-pin for making a central vent-hole in the brick.

Like letters of reference refer to like parts in the several figures.

The machine hereinafter described is designed more especially for making paving bricks or blocks having an air chamber or cavity in the bottom face and an air-vent opening leading from said cavity; but the machine is also adapted for molding other kinds of bricks.

The main frame A of the machine, which may be of any suitable construction, forms a support for the mold-wheel and the several operating parts of the machine. The mold-wheel B is mounted between the front and rear face-plates of the main frame on a shaft or axle $b$, which is journaled at its ends in bearings on the main frame. The mold-wheel is provided with a hub or rim $b'$, spaced from the hub by an annular space and connected to the hub by a web or disk $b^2$ at one side of the hub and rim. The rim of the mold-wheel is provided with a series of radially-arranged holes or pockets, which may constitute the molds for the bricks or in which detachable molds may be secured so as to be removable in order that molds for different styles of bricks may be used and the machine adapted for formation of different shapes or kinds of bricks. Each mold is provided with a radially-movable bottom C, which is supported in the mold or mold-opening by bolts or the like $c$, which are secured to the sides of the mold and project loosely through holes in flanges $c'$ on the mold-bottom. Coiled springs $c^2$ preferably surround the bolts between the mold and the flanges on the mold-bottom and act to normally hold the bottom in or toward the center of the wheel. To relieve the bolts holding the mold-bottoms from the severe strain which the pressure of the press-plunger would otherwise subject them, the bottoms are supported when opposite the press-plunger by the circular face of a segmental shoe or anvil D, which is arranged in the annular space between the hub and the rim of the wheel and is supported by the main frame and the shaft for the mold-wheel. The shoe D is preferably provided with a wedge $d$ or other suitable means for adjusting the same toward the rim of the mold-wheel and holding the same rigid.

E represents the press-plunger for pressing the clay or plastic material which has been fed into the molds to form the bricks. The plunger is mounted to reciprocate radially in guides or ways $e$ on the main frame of the machine and at its inner end is provided with a die $e'$, which is detachably secured thereto and is fashioned to properly form one face of the brick. The press-plunger is operated by a toggle mechanism, such as shown in the drawings, which is supported and constructed as follows:

F represents uprights or columns which extend up from the top of the main frame of the machine and support at their upper ends a cross-head $f$. $f'$ represents a pivot-block which is supported by means of upper inclined rods $f^2$, connecting the same with the cross-head $f$, and lower inclined rods $f^3$, connecting the same with the upper portion of the main frame of the machine.

$f^4$ represents a brace-rod or the like which is connected to the pivot-block at its upper end and at its lower end to a suitable part formed on the main frame.

G represents a toggle-joint formed of links, the upper of which is pivoted to the cross-head $f$ and the lower of which is connected at its lower end to the upper end of the press-plunger. The knuckle of the toggle-joint is connected to the link $g$ of a toggle-joint, the other link $g'$ of which is pivoted at its outer end to the pivot-block $f'$.

H represents the main drive-shaft, which is journaled in suitable bearing-brackets $h$ on the main frame and is provided with the usual tight and loose pulleys $h'$ for the driving-belt. The drive-shaft is provided with a gear-pinion $h^2$, which meshes with a gear-wheel $h^3$ on a cam-shaft $h^4$, which is journaled in one of the bearing-brackets $h$ and additional brackets $h^5$ on the main frame.

$h^6$ represents cam-disks which are fixed on the cam-shaft between the bearing-brackets $h^5$. The cam-disks are spaced apart and provided on their adjacent faces with cam grooves or tracks $h^7$, in which engage rollers on the lower end of a link $h^8$, which is pivoted to the knuckle of the toggle-joint $g$ $g'$ and extends down beneath the cam-disks.

$h^9$ represents a link pivoted to the lower end of the link $h^8$ and to a suitable part of the main frame. When the cam-disks are rotated, the link $h^8$ will be raised and lowered, so as buckle and straighten the toggle-joint $g$ $g'$ and through it the press-plunger toggle G.

I represents the supply hopper or chute for the plastic material from which the bricks are made. This hopper or chute is supported upon the main frame of the machine, and its lower end communicates with a feed-gage or measuring box or receptacle I', which is supported by the main frame of the machine radially relative to the mold-wheel, with its inner end extending into close proximity to the periphery of the mold-wheel, so as to register with the molds or mold-openings as the same are brought in the rotation of the wheel opposite thereto.

$i$ represents a gate operated by a hand-wheel or other suitable means $i'$ for regulating the size of the opening between the supply-hopper and the feed-receptacle I'.

$i^2$ represents a slide-gate which closes the inner end of the feed-receptacle.

J represents a device for feeding the plastic material from the feed-receptacle into the molds. In the construction shown it is in the form of a propeller composed of a spiral blade or wing $j$ and inclined blades or wings $j'$, supported on a rotary shaft $j^2$, arranged longitudinally in the feed-receptacle and mounted in suitable bearings on a bracket or the like secured to the feed-receptacle. The spiral and inclined blades or wings may be secured to the shaft in any suitable manner. As shown, they are carried by collars which are fixed on the shaft side by side to rotate therewith and are held by a key at one end and a bolt which passes through the other end collar. The shaft is provided with suitable means for rotating the same and permitting it to move longitudinally in the feed-receptacle. In the construction shown (see Figs. 7 and 8) the upper end of the shaft passes through the hub of a pulley $j^3$, to which it is keyed or splined. The hub of the pulley is rotatably mounted in the outer bearing $j^4$ for the shaft and is provided with annular ribs or shoulders or any other suitable means for preventing longitudinal movement of the pulley in its bearing.

$j^5$ represents a coiled spring which surrounds the feed-shaft and abuts at one end against the outer bearing $j^4$ therefor and at its inner end against an adjusting-collar $j^6$ on the shaft. When the shaft is rotated, the spiral and inclined wings or blades propel or move the material of which the bricks are formed toward the gate $i^2$ at the inner end of the feed-box. As the clay cannot escape from the box until the gate is opened, the propeller-shaft gradually works outward or away from the gate against the tension of its projecting spring $j^5$ by reason of the resistance offered by the material packing in the gate end of the feed-receptacle. When the gate is opened, the spring forces the propeller-shaft inward and pushes the material which has been packed between the inner end of the propeller and the gate into the mold which is opposite to the inner end of the feed-receptacle. The speed of rotation of the feed-shaft and the tension of the spring are so regulated that between the time the gate is closed and opened the propeller feeds just sufficient material into the space between the end of the propeller and the gate to make the brick or bricks formed in one mold. If for any reason the propeller should tend to feed more material into this space, the shaft will be forced farther outward and the spline or key will be thrown out of engagement with the groove in the hub of the driving-pulley, so that the shaft cannot rotate and will not feed more material until that in the feed-receptacle is discharged and the shaft is returned by the spring $j^5$ to its normal position, with the key engaging in its groove. The pulley of the feed device or propeller may be driven by any suitable drive connections—such, for instance, as a belt K, which connects it with a pulley $k$ on the main drive-shaft H.

$k'$ represents idler guide-pulleys for properly directing the belt to the pulleys $j^3$ and $k$. The gate $i^2$, which closes the inner end of the feed-receptacle, slides transversely in suitable ways or guides formed therefor on the end of the feed-receptacle. The gate is opened to permit the discharge of the material from the feed-receptacle into the mold and is then again closed to prevent the discharge of the material and permit the packing of the material in the feed-receptacle between the propeller and the gate, as before described, by mechanism which is preferably constructed as follows:

L represents a transverse shaft which is mounted in suitable bearings in the frame and provided with a gear-wheel $l$, which meshes with a rack-bar $l'$, connected to the gate. The shaft L is provided with a second gear-wheel $l^2$, which meshes with a vertical rack-bar $l^3$, mounted to slide in bearings $l^4$ on the machine-frame.

$l^5$ represents a coil-spring which surrounds the rack-bar $l^3$ between one of the bearings therefor and a shoulder or collar on the rack-bar. The spring tends to force the rack-bar downwardly and rotate the shaft L to cause the outward movement of the rack-bar $l'$ and the opening of the gate. The rack-bar is held up against the action of the spring by a trigger $l^6$, pivoted on a fixed part of the frame and engaging beneath a projection $l^7$ on the rack-bar.

M represents a rock-arm which is secured to a shaft $m$, journaled in suitable bearings provided therefor on one of the uprights F of the frame. The shaft has secured thereto a lever $m'$, which is pivoted to the lower link of the toggle-joint G for the press-plunger. When the toggle-joint is broken to raise the plunger, the lever $m'$ is raised and the arm M lowered. The arm is provided with a projection $m^2$, adapted to engage with the spring-pressed trigger $l^6$. When the projection $m^2$ strikes the trigger, it releases the rack-bar and permits the spring to throw the same downwardly and open the gate. When the toggle-joint for the press-plunger is straightened to lower the plunger, the arm M is raised and engages under a projection $m^3$ on the rack-bar $l^3$ and lifts the latter until the projection $l^7$ thereon is engaged and held by the trigger. The gate is thus opened and closed each time the press-plunger is raised and lowered.

N, Fig. 7, represents a flat spring which is secured to the gate $i^2$. When the gate is closed, the end of the spring abuts against the end of the feed-receptacle and is buckled or bowed, so as to press on the outer face of the material in the mold and smooth the same when the mold-wheel is rotated.

The mold-table is intermittently rotated to carry the molds successively to the feeding mechanism and then to the press-plunger by suitable mechanism. The mechanism shown in the drawings for this purpose (see Fig. 3) is constructed as follows:

O represents a ratchet-wheel which is fixed to the rear end of the mold-wheel shaft, and O' represents a pawl-lever which is loosely hung on the shaft and is provided with a pawl $o'$, held in yielding contact with the teeth of the ratchet-wheel by a suitable spring or the like. The free end of the pawl-lever is connected by a coil-spring $o^2$ to the lower end of a lever or arm $o^3$, fixed on a horizontal rock-shaft $o^4$, mounted in suitable bearings on the top of the frame and which is provided with a rock arm or lever $o^5$, which at its upper end is pivoted to the projecting end of the toggle-link $g$.

P, Figs. 3 and 6, represents a latch-bolt or the like which is slidably mounted in a hole in the rear face-plate of the frame and is pressed against the rear face of the mold-wheel by a spring $p$, which surrounds the stem of the bolt between a shoulder thereon and a cap or block $p'$, which closes the outer end of the hole in the frame in which the bolt is located. The bolt is adapted to engage in either of a circular series of holes or grooves $p^2$ in the rear face of the mold-wheel. The grooves are each provided with an abrupt face or shoulder and an inclined face, so that the bolt can ride on the face of the mold-wheel and down into the grooves as the same are brought successively opposite the bolt. The bolt holds the mold-wheel from turning forwardly more than one step, or the distance between two molds.

Q represents a rock-shaft which is journaled in suitable bearings $q$ on the rear side of the frame. This shaft is provided at one end with an arm $q'$, which is grooved and provided with an outwardly-facing inclined face $q^2$ and an inwardly-facing inclined face $q^3$.

$q^4$ represents a stud or finger secured to the gear-wheel $h^3$ and projecting therefrom, so as to engage in the rotation of the wheel with the inwardly-inclined face $q^2$ on the rock-arm $q'$ and rock the arm and the rock-shaft Q.

$q^5$ represents an arm which is loosely hung on the rock-shaft and at its lower end is provided with an opening or eye through which the outer portion of the latch-bolt passes. The arm $q^5$ is provided with a slot $q^6$, in which a pin on the rock-shaft engages. When the shaft is rocked, the pin will move in the slot until it engages the upper end of the slot, when the arm $q^5$ will rock with the shaft and engage an enlargement $q^7$ on the outer end of the latch-bolt and move the latter out to disengage the bolt from the abrupt shoulder on the mold-wheel. The slot-and-pin connection of the arm $q^5$ to the rock-shaft permits the arm to remain stationary during the first part of the movement of the rock-shaft for a purpose hereinafter described. When the press-plunger is raised by the bending of its operating-toggle, the arm $o^5$ is rocked and the arm $o^3$, connected to the pawl-lever $o'$, is moved away from the pawl-lever, which, together with the ratchet-wheel and mold-wheel, are held from movement by the latch-bolt.

The spring $o^2$ is thus placed under tension. When the bolt is released by the mechanism above described, the spring $o^2$ contracts and swings the pawl-lever on its shaft, carrying the ratchet-wheel and mold-wheel around with it. The mold-wheel is thus moved quickly. It is stopped by the latch-bolt engaging in the next succeeding groove in the mold-wheel.

The machine described is especially adapted for making paving bricks or blocks which are provided with air-cavities in their bases or bottoms and with air-vent openings leading from said air-cavities through the body of the brick. R, Fig. 5, represents a perforating-pin which is intended for making the vent-openings. This pin is carried by the inner end of a plunger $r$, which is slidably mounted in a pocket in the rear face-plate of the machine to move toward and from the mold-wheel, which is provided with an opening to permit the perforating-pin to project through the side of the mold into the material of the brick therein. The plunger $r$ is normally held outward or away from the mold-wheel by suitable means—for instance, a coil-spring $r'$, which surrounds the plunger between a shoulder or enlargement $r^2$ thereon and a shoulder in the pocket in which the plunger is located.

$r^3$ represents a rock-arm which is fixed to the rock-shaft Q and its lower end is provided with a forked portion having slots in which engage a transverse pin $r^4$, secured to the plunger of the perforating-pin. The plunger is moved in or toward the mold-wheel to cause the pin to perforate the brick by means of a finger or stud $r^5$, which is carried by the gear-wheel $h^3$ in advance of the operating-pin thereon for the latch-bolt. This finger $r^5$ coöperates with the outwardly-facing inclined face $q^2$, formed on the arm $q'$, secured to the rock-shaft Q. The cam-face $q^2$ is provided with a long inclined upper portion and an abrupt outturned lower portion. When the finger $r^5$ engages the inclined face, it swings the arm $q'$ inward, thus rocking the rock-shaft in a direction to move the plunger in toward the mold-wheel and cause the perforating-pin to enter the brick. The perforating-pin is again immediately withdrawn from the hole in the mold-wheel by the finger $q^4$ on the gear-wheel, which follows the finger $r^5$ and coöperates with the inwardly-facing inclined face $q^3$ on the arm, as above described. The slot-and-pin connection between the rock-shaft and the operating-arm for the latch-bolt permits the perforating-pin to be moved in and again withdrawn before the latch-bolt is released to move the mold-wheel.

S represents an ejecting-plunger which is arranged in the annular space between the hub and rim of the mold-wheel and is adapted to strike the movable bottoms of the molds as they are successively brought beneath the same and force the bricks from the molds onto a suitable endless conveyer or the like arranged beneath the mold-wheel. The plunger is carried by a lever $s$, which is pivoted to the main frame.

$s'$ represents a vertical rod which is connected at its lower end to the lever $s$ and passes up through a bearing-lug $s^2$ on the inside of the front face-plate of the machine. The rod is normally held up to raise the lever and hold the plunger out of the mold by a coil-spring $s^3$, surrounding the rod between the lug $s^2$ and a collar on the rod. The upper end of the rod $s'$ is arranged beneath the end of the lever $m'$, which is connected to the operating-toggle for the press-plunger. When the toggle is straightened to lower the plunger, the arm $m'$ engages the upper end of the rod $s'$ and moves the ejecting-plunger down into engagement with the bottom of the mold which is beneath the same to eject the brick therefrom.

In Fig. 9 is shown a construction of mold and press-plunger for forming paving bricks or blocks with a central vent-opening. The perforating-pin T is carried by the mold-bottom and projects upwardly or radially into the mold. When the material is pressed over the mold, it is forced downwardly over the pin and a hole is made in the brick. The inner end of the plunger or die carried by the same is provided with a central opening registering with the upper end of the perforating-pin and which the pin is adapted to enter when the plunger is moved into the mold. $t$ represents a pin which is arranged in a socket in the plunger-die with its lower end in the opening in the die. This pin is normally projected downwardly or outward by a coil-spring $t'$, which surrounds the pin in the socket between a shoulder on the pin and a screw-plug or the like $t^2$, which closes the inner end of the socket. When the plunger is moved down to press the material in the mold, the perforating-pin carries a small plug of material into the opening in the plunger-die and forces the pin $t$ inwardly against the tension of its spring. When the press-plunger is lifted, the pin $t$ is projected outwardly by its spring and ejects the material from the opening. This arrangement permits the escape of air from the brick being pressed through the opening in the plunger-die into the socket thereof, from which it can escape through the oil-opening $t^3$.

The operation of the machine is as follows: The plastic material is packed by the rotary propeller J between the same and the gate $i^2$. When the press-plunger E is raised, the gate is opened by the described connections between the same and the plunger-toggle G, and the material in the feed-receptacle is shoved by the propeller J into the mold. The latch-bolt P is then released and the mold-wheel quickly moved by the ratchet mechanism to carry the filled mold beneath the press-plunger. The plunger is then lowered to press the brick, which movement of the press-plunger again closes the feed-receptacle gate $i^2$. The molds are thus successively filled and the bricks successively pressed. The pressed bricks are successively carried by the mold-wheel around beneath the ejecting-plunger S. The latter is moved down to eject the bricks onto the conveyer beneath the mold-wheel by the described connections between the same and the press-plunger toggle. A mold is filled, a brick pressed, and a brick ejected at each period of rest of the mold-wheel.

I claim as my invention—

1. The combination with a mold, of a feed-receptacle, a gate which closes the discharge-opening of said receptacle, a rotary feed device for feeding the plastic material toward said gate, means for moving said gate to uncover said discharge-opening and permit the discharge of the material, and means for projecting said feed device toward the gate to move the material between said feed device and said gate bodily into the mold when said discharge-opening is uncovered, substantially as set forth.

2. The combination with a mold, of a feed-receptacle, a gate which closes the discharge-opening of said receptacle, a rotary feed device for feeding the plastic material between the same and said gate and which is movable away from the gate to give place to the material, means for moving said gate to uncover said discharge-opening and permit the discharge of the material, and means for projecting said feed device toward the gate to move the material between said feed device and said gate bodily into the mold when said discharge-opening is uncovered, substantially as set forth.

3. The combination with a mold, of a supply-hopper, a feed-receptacle communicating therewith, a gate for said feed-receptacle, a rotary feed device in said feed-receptacle and movable toward and from said gate, means rotating said feed device, means for opening said gate, and a spring for moving said feed device toward said gate to eject the material from said feed-receptacle, substantially as set forth.

4. The combination with a mold, of a supply-hopper, a feed-receptacle communicating therewith, a gate for said feed-receptacle, a rotary shaft movable away from said gate and provided with one or more inclined blades for feeding the material toward said gate, means for rotating said feed-shaft, means for opening said gate, and a spring for moving said feed-shaft toward said gate to eject the material from said feed-receptacle, substantially as set forth.

5. The combination with a mold and a press-plunger, of a feed-receptacle, a gate which closes the discharge-opening of said receptacle, a rotary feed device for feeding the plastic material toward said gate, means controlled by said press-plunger for moving said gate to uncover said discharge-opening and permit the discharge of the material, and means for projecting said feed device toward said gate to move the material from said feed-receptacle into the mold when said discharge-opening is uncovered, substantially as set forth.

6. The combination of a mold-wheel, and mechanism for intermittently rotating the same, comprising a ratchet-wheel connected to the mold-wheel, a pawl coöperating with said ratchet-wheel, an operating device for said pawl, releasable means for holding said mold-wheel from movement during the movement of said operating device, and means for moving said mold-wheel when released, substantially as set forth.

7. The combination of a mold-wheel, and a ratchet-and-pawl mechanism for intermittently rotating the same comprising a ratchet-wheel connected to the mold-wheel, a pawl-lever, a pawl carried thereby, an operating-lever, a spring connecting said operating-lever with said pawl-lever, and releasable means for holding said mold-wheel from movement during the movement of said operating-lever, substantially as set forth.

8. The combination with a mold having a perforating-pin, of a press-plunger provided with a hole which said pin is adapted to enter, and a spring-pressed pin arranged in said hole in the press-plunger, substantially as set forth.

9. The combination of a mold-wheel, mechanism for intermittently rotating the same, a releasable bolt for holding said mold-wheel, a perforating-pin adapted to extend into the mold-cavity in the mold-wheel, and a common mechanism for operating said bolt and said perforating-pin, substantially as set forth.

10. The combination of a mold-wheel, mechanism for intermittently rotating the same, a releasable bolt for holding said mold-wheel, a perforating-pin adapted to extend into the mold-cavity in the mold-wheel, a rock-shaft, a rock-arm secured to said shaft and connected to said perforating-pin, a rock-arm having a loose connection with said shaft and connected to said bolt, and means for rocking said shaft, substantially as set forth.

Witness my hand this 24th day of February, 1902.

WILLIAM J. LEARY.

Witnesses:
JNO. J. BONNER,
CLAUDIA M. BENTLEY.